Aug. 29, 1933. C. G. OLSON 1,924,695
LOCK WASHER ASSEMBLY
Filed June 24, 1931
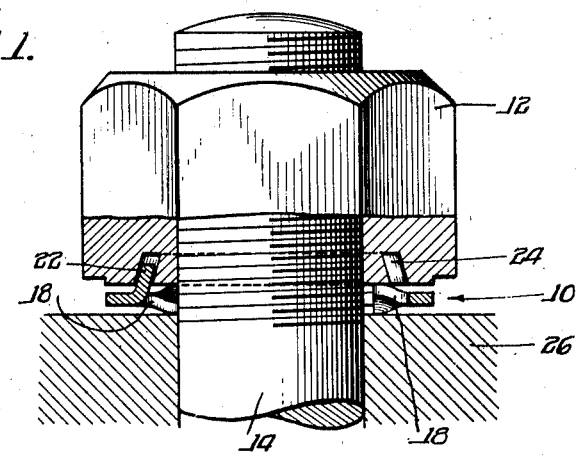
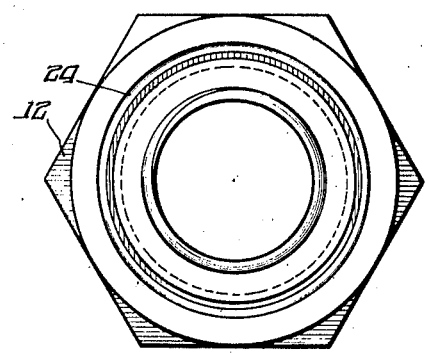
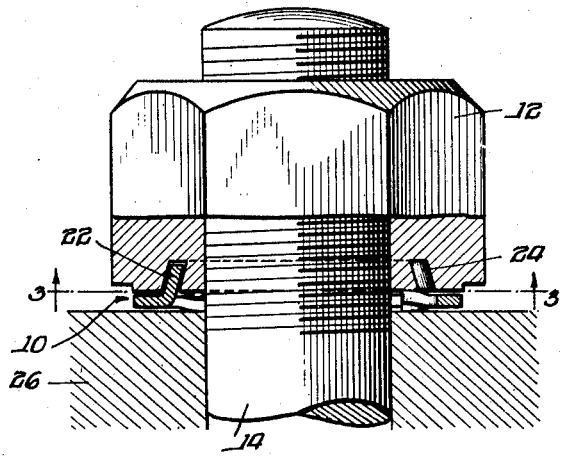
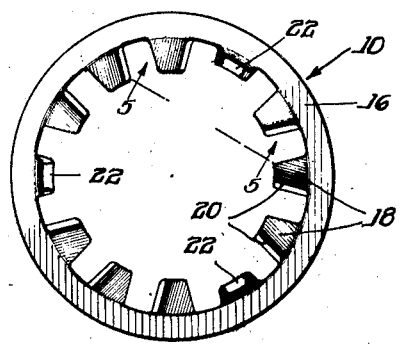
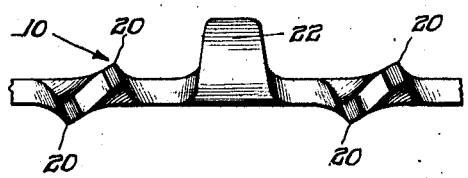
Inventor:
Carl G. Olson, Patented Aug. 29, 1933

1,924,695

UNITED STATES PATENT OFFICE 1,924,695

LOCK WASHER ASSEMBLY

Carl G. Olson, Chicago, Ill., assignor to Shakeproof Lock Washer Company, Chicago, Ill., a corporation of Delaware Application June 24, 1931. Serial No. 546,540

4 Claims. (Cl. 151—37)

This invention relates generally to lock washer assemblies, and more particularly to the assembly of lock washers of the pronged type with rotary clamping elements, such as nuts and the like.

It is one of the primary objects of my present invention to provide, in combination with a tightening or clamping element, such as a clamping bolt, head, or nut, a lock washer which is secured to said clamping member in a very effective and novel manner.

More specifically, my invention contemplates the provision of an assembly, as set forth above, in which a pronged lock washer is secured in operative relation with respect to a companion rotary clamping member in such a manner that, when said clamping member is tightened, the washer will become permanently anchored or locked to the work piece before it becomes anchored or locked to the clamping member or nut.

A still further object of the invention is to provide, in combination with a rotary clamping member as set forth above, a washer of the flat spring type having laterally extending means cooperatively arranged with respect to a recess in the clamping side of the nut, whereby, upon the initial tightening of the nut, said washer will first lock itself within the work piece and subsequently lock itself within the clamping surface of the nut.

Another object of my present invention is to provide a lock washer assembly as set forth above, which eliminates the necessity of modifying the structure of the clamping member or nut to any great extent, thereby enabling standard types of nuts to be equipped with lock washers, and to this end I propose to provide a washer construction having a lateral projection which fits into a relatively small annular groove provided on the clamping side of the nut.

The foregoing and numerous other objects and advantages will be more apparent from the following detailed description when considered in connection with the accompanying drawing, wherein—

Figure 1 discloses a lock washer assembly which is representative of one embodiment of my invention, a portion of the nut, work piece, and washer being broken away to more clearly illustrate my invention;

Figure 2 is a view similar to Figure 1 disclosing the relative positions of the parts after the nut has been completely tightened against the work piece;

Figure 3 is a view of the underside of the clamping nut detached from the washer and threaded bolt, said view being taken substantially along the line 3—3 of Figure 2;

Figure 4 is a plan view of the washer detached from the clamping nut and work piece; and Figure 5 is an enlarged fragmentary view of the washer taken substantially along the line 5—5 of Figure 4.

Referring now to the drawing more in detail wherein like numerals have been employed to designate similar parts throughout the various figures, it will be seen that one embodiment of the invention comprises a washer designated generally by the numeral 10 and a rotary clamping member or nut 12, which is adapted to be mounted upon the threaded surface of a bolt 14. The washer 10 includes an annular body portion 16, which is provided along its inner margin with radial prongs 18, which are warped out of the plane of the washer stock so as to present oppositely disposed work engaging edges 20, Figure 5. At spaced intervals along the inner margin of the body portion 16 I provide projections 22 which extend out of the plane of the washer body and are slightly inclined inwardly toward the washer axis.

The nut 12 is provided in its clamping surface or side with an annular groove 24. In the particular embodiment disclosed in the drawing the groove 24 is inclined toward the axis of the nut to about the same degree that the projections 22 are inclined with respect to the axis of the washer 10. The groove 24 may be slightly wider than the thickness of the washer stock so as to permit the washer 10 to be loosely held within the nut after the projections 22 have been sprung into said groove.

As the nut and washer assembly are tightened against a work piece 26, the free mounting of the washer within the nut permits the prongs of the washer to lockingly imbed themselves within the work piece, and at the same time permit the continued rotation of the nut in a clamping direction. When the nut has been shifted from the position shown in Figure 1 to the position shown in Figure 2, the locking edges 20 of the washer will have imbedded themselves within the surface of the work piece 26, as well as the clamping surface of the nut 12. Any force tending to move the nut in a retrograde direction will be vigorously opposed by the biting action of these locking edges 20.

From the foregoing it will be apparent that my invention contemplates the provision of a very simple and economical lock washer assembly. The washer may be made in the usual manner, and instead of employing three or more of the prongs 18 to lockingly engage the work piece, these prongs are bent out of the plane of the washer stock to provide the projections 22. In other words, specially constructed dies need not be provided to form the lateral projections 22. Furthermore, the nut 12 need only be subjected to a very simple machining operation to provide the annular groove 24, and this may be formed at the time said nut is being initially produced. That is to say, nuts, bolt heads, and the like of standard construction may be equipped with lock washers by merely forming a small annular groove therein. The groove provided in the bolt head or nut is so small that its presence does not in any way affect the strength of the nut. While I have described my invention in connection with washers having internal prongs, it will be apparent that washers having external prongs may be secured to rotary clamping devices in the manner described above.

Changes in the specific structure disclosed in the drawing may be made without departing from the spirit and scope of the appended claims.

Having thus described my invention, what I claim as new and desire to secure by Letters Patent is:

1. A lock washer assembly including a rotary clamping member having a clamping surface provided with a recess and a lock washer formed of flat spring stock, said washer including an annular body portion and a plurality of internal marginal resilient prongs warped out of the plane of said body portion, and a projection extending from said body portion and inclined with respect to the axis of the washer, said projection being adapted for insertion within the recess of said clamping member, a sufficient inner marginal surface being provided on said rotary clamping member to cooperate with said internal prongs.

2. A lock washer assembly including a rotary clamping member having an annular groove of varying diameter provided on the clamping side thereof, the larger diameter of said groove being positioned at the clamping side of said clamping member, and a lock washer formed from flat spring stock including an annular body portion and marginal prongs extending therefrom, said washer being provided with a projection extending laterally of said body portion and adapted to be received by said annular groove.

3. A lock washer assembly including a rotary clamping member having an annular recess formed on the clamping side thereof, said recess having a smaller diameter at its inner than at its open end, and a lock washer having a section adapted to extend within said annular recess, whereby said washer is secured in operative position with respect to the clamping side of said clamping member, a sufficient inner marginal surface being provided on said rotary clamping member for cooperating with said lock washer.

4. A lock washer assembly including a rotary member having an annular clamping surface, an annular recess extending axially of said rotary clamping member and terminating intermediate the inner and outer margins of the clamping surface thereof, said recess having oppositely facing conical walls, and a lock washer having a section adapted to extend within said annular recess, said washer being provided with internal teeth adapted to lockingly engage the portion of the clamping surface enclosed by said recess, the disposition of the recess and projection being such as to secure said washer in juxtaposition with respect to the clamping surface of the rotary member.

CARL G. OLSON.